US010946766B2

(12) United States Patent
Hamada et al.

(10) Patent No.: US 10,946,766 B2
(45) Date of Patent: Mar. 16, 2021

(54) ELECTRICALLY POWERED VEHICLE

(71) Applicant: SUBARU CORPORATION, Tokyo (JP)

(72) Inventors: Kazu Hamada, Tokyo (JP); Kosuke Hirabayashi, Tokyo (JP); Kazuhiro Goto, Tokyo (JP); Akihiro Kawakami, Tokyo (JP); Satoshi Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/429,305

(22) Filed: Jun. 3, 2019

(65) Prior Publication Data
US 2020/0086761 A1   Mar. 19, 2020

(30) Foreign Application Priority Data

Sep. 13, 2018  (JP) .............................. JP2018-171080

(51) Int. Cl.

| | | |
|---|---|---|
| *B60L 1/00* | (2006.01) | |
| *B60L 58/19* | (2019.01) | |
| *B60L 50/60* | (2019.01) | |
| *B60L 58/12* | (2019.01) | |
| *B60L 58/16* | (2019.01) | |
| *H02P 27/06* | (2006.01) | |

(52) U.S. Cl.
CPC .............. *B60L 58/19* (2019.02); *B60L 50/66* (2019.02); *B60L 58/12* (2019.02); *B60L 58/16* (2019.02); *B60L 2240/545* (2013.01); *B60L 2240/547* (2013.01); *B60L 2240/549* (2013.01); *B60Y 2200/91* (2013.01); *B60Y 2300/91* (2013.01); *H02P 27/06* (2013.01)

(58) Field of Classification Search
CPC ....................................................... B60L 58/19
USPC ........................................................ 307/9.1
See application file for complete search history.

(56) References Cited

U.S. PATENT DOCUMENTS

2016/0006377 A1   1/2016   Hashimoto

FOREIGN PATENT DOCUMENTS

| JP | 2010-006093 A | 1/2010 |
|---|---|---|
| JP | 2010-11524 A | 1/2010 |
| JP | 2010-057288 A | 3/2010 |
| JP | 2014-180080 A | 9/2014 |
| JP | 2016-13819 A | 1/2016 |

OTHER PUBLICATIONS

Notification of reason(s) for refusal issued in corresponding Japanese Patent Application No. 2018-171080 dated Feb. 4, 2020, with machine translation.

*Primary Examiner* — Rexford N Barnie (74) *Attorney, Agent, or Firm* — Troutman Pepper Hamilton Sanders LLP (57) ABSTRACT

An electrically powered vehicle includes a battery, a mounting member, a switch, and a switch controller. The battery is configured to supply power for moving. On the mounting member, a supplementary battery configured to supply power for moving is detachably mountable. The switch is configured to switch connection of the battery and the supplementary battery mounted on the mounting member between series and parallel connections. The switch controller is configured to control the switch in accordance with condition information about the battery and condition information about the supplementary battery mounted on the mounting member.

15 Claims, 10 Drawing Sheets

ELECTRICALLY POWERED VEHICLE

CROSS-REFERENCE TO RELATED APPLICATIONS

The present application claims priority from Japanese Patent Application No. 2018-171080 filed on Sep. 13, 2018, the entire contents of which are hereby incorporated by reference.

BACKGROUND

The disclosure relates to an electrically powered vehicle.

A configuration of an electrically powered vehicle, such as a hybrid electric vehicle (HEV) or an electric vehicle (EV), has been proposed in which an additional battery can be loaded as an option. As an example of such a configuration of an electrically powered vehicle, FIG. 4 in Japanese Unexamined Patent Application Publication (JP-A) No. 2010-006093 illustrates a configuration including a basic battery and an additional battery that are coupled in a manner in which the connection is switchable between series and parallel connections via a converter. JP-A No. 2010-006093 also proposes that, when it is assumed that the travel distance is intended to be increased, a suggestion is made for a user to couple the additional battery in parallel to the basic battery, and when it is assumed that the motor output is intended to be increased, a suggestion is made for a user to couple the additional battery in series to the basic battery.

Japanese Unexamined Patent Application Publication (JP-A) No. 2010-057288 proposes a power supply apparatus including a first power storage unit and a second power storage unit that are coupled in a manner switchable between series and parallel connections. As described in paragraph 0034 of JP-A No. 2010-057288, whenever the state of charge (SOC) of the first power storage unit and the state of charge of the second power storage unit differ from each other, the first power storage unit and the second power storage unit are coupled to each other in parallel. The difference in the state of charge between the first power storage unit and the second power storage unit is decreased by switching the connection of the first power storage unit and the second power storage unit to parallel connection, and as a result, when the connection of the first power storage unit and the second power storage unit is subsequently switched to series connection, the first power storage unit and the second power storage unit can supply maximum power.

SUMMARY

An aspect of the disclosure provides an electrically powered vehicle that includes a battery configured to supply power for moving, a mounting member on which a supplementary battery configured to supply power for moving is detachably mountable, a switch configured to switch connection of the battery and the supplementary battery mounted on the mounting member between series and parallel connections, and a switch controller configured to control the switch in accordance with condition information about the battery and condition information about the supplementary battery mounted on the mounting member.

An aspect of the disclosure provides an electrically powered vehicle that includes a battery configured to supply power for moving, a mounting member on which a supplementary battery configured to supply power for moving is detachably mountable, circuitry configured to switch connection of the battery and the supplementary battery mounted on the mounting member between series and parallel connections, and a switch controller configured to control the switch in accordance with condition information about the battery and condition information about the supplementary battery mounted on the mounting member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 8A illustrates the case of powering and FIG. 8B illustrates the case of regeneration.

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. A kind of service is considered in which, when a user of an electrically powered vehicle desires to extend the drive range of the electrically powered vehicle, the user can additionally load into the electrically powered vehicle a charged battery that is prepared in, for example, a service area or at a service station.

In such a kind of service, it is assumed that, whenever a battery is additionally loaded, the battery specifications, such as the electric capacity, and the battery condition, such as the state of charge and the degradation level, vary with respect to the battery that is additionally loaded and a battery that is originally loaded on the electrically powered vehicle.

In such a case where a battery is additionally loaded, if the control is the same as that of the known power supply apparatuses described above, it is difficult to effectively utilize both the power of the originally loaded battery and the power of the additionally loaded battery.

It is desirable to provide an electrically powered vehicle in which both the power of the originally loaded battery and the power of the additionally loaded battery are effectively utilized when there is a substantial difference in the specifications or the battery condition between the originally loaded battery and the added battery.

Figure 1:
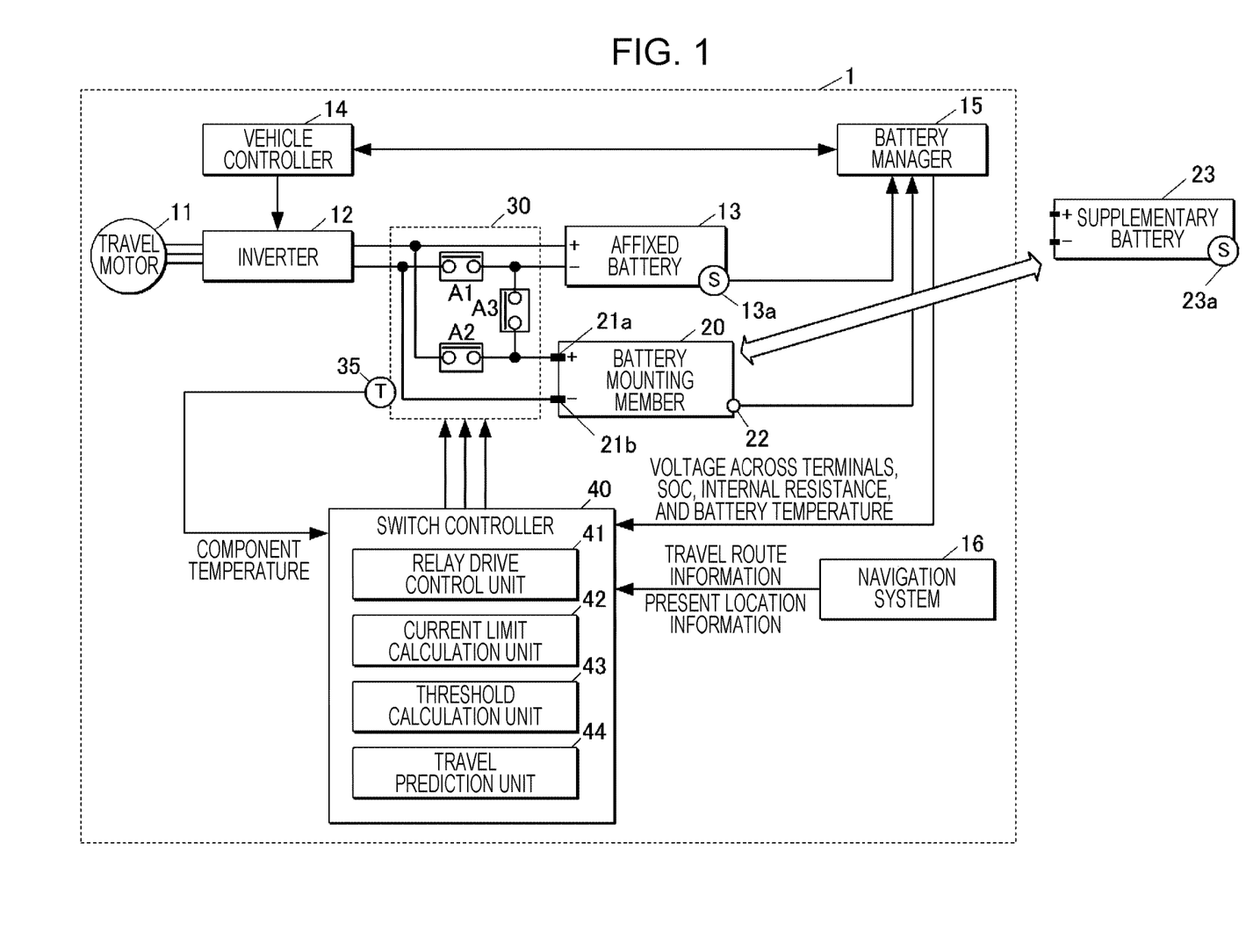
FIG. 1 is a block diagram illustrating main parts of an electrically powered vehicle according to an embodiment of the disclosure.

An electrically powered vehicle 1 according to the embodiment of the disclosure is, for example, an EV and includes a travel motor 11, an inverter 12, an affixed battery 13, a vehicle controller 14, a battery manager 15, and a navigation system 16. The electrically powered vehicle 1 also includes a battery mounting member 20, a switch 30, and a switch controller 40. The affixed battery 13 corresponds to a battery according to an example of the disclosure. The battery mounting member 20 corresponds to a mounting member according to an example of the disclosure.

During powering, the travel motor 11 generates power for moving and drives drive wheels of the electrically powered vehicle 1, which are not illustrated in the drawings. During powering, the inverter 12 converts direct current (DC) power to alternating current (AC) power and outputs the converted power to the travel motor 11, and as a result, the travel motor 11 is driven. In contrast, during regeneration, the travel motor 11 inhibits motion of the drive wheels of the electrically powered vehicle 1 and converts braking energy into regenerative power. During regeneration, the inverter 12 converts the regenerative power received from the travel motor 11 to DC power and returns the DC power upstream. The vehicle controller 14 controls the inverter 12 in accordance with an operation performed by an operating component (not illustrated), such as a steering wheel, an accelerator pedal, a brake pedal, or a shift lever, and as a result, driving in accordance with operations performed by a driver is accomplished.

The affixed battery 13 is, for example, a lithium-ion rechargeable battery or a nickel metal hydride rechargeable battery and accumulates power for moving. The affixed battery 13 may also be referred to as a high voltage battery. The condition sensor 13a is provided for the affixed battery 13. The condition sensor 13a is configured to measure, for example, the battery temperature, the voltage across terminals, and current. The voltage across terminals that is measured includes the open-circuit voltage (also referred to as the voltage measured when terminals are in an open state), the discharge voltage (also referred to as the voltage measured while discharging), or both. The affixed battery 13 is originally loaded in the electrically powered vehicle 1. The affixed battery 13 may include a battery that is added as an option at a manufacturer's factory or at a dealer's factory.

The battery mounting member 20 is a unit on which the supplementary battery 23 is detachably mountable. Connection electrodes 21a, 21b, and 22 are provided for the battery mounting member 20. In the state in which the supplementary battery 23 is mounted on the battery mounting member 20, the connection electrodes 21a, 21b, and 22 are coupled respectively to electrodes (an anode and a cathode) of the supplementary battery 23 and an output terminal of a condition sensor 23a.

The supplementary battery 23 is, for example, a lithium-ion rechargeable battery or a nickel metal hydride rechargeable battery and accumulates power for moving. The supplementary battery 23 may also be referred to as a high voltage supplementary battery. The condition sensor 23a is configured to measure, for example, the battery temperature, the voltage across terminals, and the current and is provided for the supplementary battery 23. The voltage across terminals that is measured includes the open-circuit voltage, the discharge voltage, or both. The supplementary battery 23 can be attached or detached with respect to the battery mounting member 20 of the electrically powered vehicle 1 by, for example, a user or service staff of a service area or a service station. The supplementary battery 23 is prepared in a charged state in, for example, a service area or at a service station of a highway and additionally loaded onto the battery mounting member 20 in response to a request from a user of the electrically powered vehicle 1.

When the supplementary battery 23 is loaded into the electrically powered vehicle 1, the switch 30 can switch the connection of the affixed battery 13 and the supplementary battery 23 between series and parallel connections. The switch 30 includes multiple relays A1 to A3 configured to switch electrical connection of electrodes (an anode and a cathode) of the affixed battery 13 and the connection electrodes 21a and 21b of the battery mounting member 20. Switching of the relays A1 to A3 is performed in the following manner. For example, when the supplementary battery 23 is not loaded in the electrically powered vehicle 1, the relay A1 is closed and thus power transmission between the affixed battery 13 and the inverter 12 is enabled. When the supplementary battery 23 is loaded in the electrically powered vehicle 1, the relays A1 and A2 are closed and the relay A3 is open, and thus, the affixed battery 13 and the supplementary battery 23 are coupled to each other in parallel and power transmission among the affixed battery 13, the supplementary battery 23, and the inverter 12 is enabled. When the relays A1 and A2 are open and the relay A3 is closed, the affixed battery 13 and the supplementary battery 23 are coupled to each other in series, and as a result, power transmission among the affixed battery 13, the supplementary battery 23, and the inverter 12 is enabled. Hereinafter, the parallel connection and the series connection described above are referred to as connection modes of the switch 30.

The battery manager 15 receives from the condition sensor 13a of the affixed battery 13 a measurement signal indicating, for example, the battery temperature, the voltage across terminals, and the current of the affixed battery 13. When the supplementary battery 23 is loaded, the battery manager 15 receives a measurement signal indicating, for example, the battery temperature, the voltage across terminals, and the current of the supplementary battery 23 from the condition sensor 23a of the supplementary battery 23 via the connection electrode 22 of the battery mounting member 20. The battery manager 15 calculates the condition of the affixed battery 13 and the condition of the supplementary battery 23 in accordance with the measurement signal and accordingly manages the conditions. The battery condition includes, for example, the battery temperature, the voltage across terminals, the state of charge, the dischargeable power, the chargeable power, and the degradation level (for example, the internal resistance).

The battery manager 15 communicates with the vehicle controller 14 and controls power transmitted by the inverter 12 during powering or regeneration to not exceed the maximum output power or the maximum input power.

The navigation system 16 includes a position measuring device, a traffic information receiving device, an input device via which a user inputs an operation, and a display device. The navigation system 16 calculates a travel route in accordance with destination information that is input by a user and accordingly provides travel route information for the user via the display device.

The switch controller 40 controls switching of the connection mode of the switch 30 between parallel and series connections. The switch controller 40 is an electronic control unit (ECU) including a central processing unit (CPU), a read only memory (ROM) storing a control program that is run by the CPU, and an input/output (I/O) unit configured to input and output signals. In the switch controller 40, various function modules are implemented by the CPU running the control program. The function modules include a relay drive control unit 41, a current limit calculation unit 42, a threshold calculation unit 43, and a travel prediction unit 44.

The switch controller 40 receives from the battery manager 15 condition information about the affixed battery 13 and condition information about the supplementary battery 23 that are used for controlling switching of the switch 30. The condition information about the affixed battery 13 and the condition information about the supplementary battery 23 each include the voltage across terminals (the open-circuit voltage, the discharge voltage, or both), the SOC, the internal resistance, and the battery temperature of each battery. These kinds of condition information may be transmitted directly to the switch controller 40 from the condition sensor 13a of the affixed battery 13 and the condition sensor 23a of the supplementary battery 23 not via the battery manager 15. In this case, the condition sensors 13a and 23a may each calculate the SOC and information of the degradation level, such as the internal resistance.

The switch controller 40 receives from at least one temperature sensor 35 a signal indicating the temperature of at least one heat-generating component of the circuit in which current from the affixed battery 13 and the supplementary battery 23 flows. Power lines and the relays A1 to A3 of the switch 30 are examples of the heat-generating component.

The switch controller 40 also receives from the navigation system 16 the travel route information and present location information.

The switch controller 40 controls switching of the switch 30 in accordance with the condition information about the affixed battery 13 and the condition information about the supplementary battery 23 mounted on the battery mounting member 20. More specifically, the switch controller 40 controls switching of the switch 30 in accordance with the comparison result between the voltage difference, which is the difference between the voltage across terminals of the affixed battery 13 and the voltage across terminals of the supplementary battery 23, and a threshold calculated in accordance with the condition information.

The switch controller 40 controls switching on the principle described below, the detailed description of which will be given later. Here, the affixed battery 13 and the supplementary battery 23 are both simply referred to as a battery.

Typically, as the value of the SOC of a battery decreases, the voltage across terminals of the battery decreases. In the case where the electric capacity differs between two batteries or in the case where the initial SOC differs between two batteries, when the two batteries are coupled to each other in series, the SOC of each of the two batteries changes as the consumption of electric power increases, and as a result, the difference in the voltage across terminals between the two batteries increases. In a state in which there is a difference in the voltage across terminals between the two batteries, when the connection mode is switched to parallel connection, current flows from one battery having a higher voltage across terminals to another battery having a lower voltage across terminals, and consequently, the SOC of the one battery and the SOC of the other battery becomes equal to each other. When the difference in the voltage across terminals is small, the flowing current is small; and when the difference in the voltage across terminals is large, the flowing current is large. Hereinafter, the difference in the voltage across terminals between two batteries is referred to as the voltage difference.

For example, it is considered to apply one kind of control of switching in which, when the voltage difference is small, the connection mode is switched to parallel connection, and when the SOC of one battery and the SOC of another battery is equal to each other, the connection mode is switched to series connection. In this case, shortly after the connection mode is switched to series connection, the voltage difference reaches a level at which the connection mode is switched to parallel connection. This causes a problem in which the number of times the connection mode is switched increases and thus the deterioration of the relays A1 to A3 is accelerated. In the case where the connection mode is switched between series and parallel connections without consideration of the voltage difference for the purpose of reducing the number of times the connection mode is switched, when the voltage difference is considerably large, the connection mode is switched to parallel connection. In this case, the current flowing between two batteries becomes large when the connection mode is switched to parallel connection, and thus, the output current or the input current of one or both of the two batteries may exceeds a current limit.

In this respect, the switch controller 40 calculates a threshold of the voltage difference at which the current of at least one battery does not exceed the current limit and switches the connection mode of the switch 30 in accordance with the comparison result between the voltage difference and the threshold. In this manner, when the connection mode is switched to parallel connection, the current of at least one battery can be controlled to not exceed the current limit and it is also possible to suppress the increase in the number of times the switch 30 is switched. The current limit and the threshold of the voltage difference are calculated as follows.

A battery usually has the upper limit voltage and the lower limit voltage beyond which voltage cannot increase or decrease. When a current is output from a battery, voltage drop is caused by the current flowing through internal resistance and the voltage across terminals of the battery decreases. Conversely, when a current is input to a battery, voltage drop is caused by the current flowing through internal resistance and the voltage across terminals of the battery increases. Accordingly, the switch controller 40 can calculate the current limit in accordance with the open-circuit voltage and the internal resistance of the battery to control the voltage across terminals to not increase or decrease beyond the upper limit voltage or the lower limit voltage.

In the case where the connection mode of two batteries is switched to parallel connection, when no current flows between the two batteries and a load, the current flowing between the two batteries is determined in accordance with the internal resistance of each battery and the voltage difference. When a current flows between the two batteries and a load, the current flowing between the two batteries can be obtained by adding the current flowing between the two batteries and the load to a current determined in accordance with the internal resistance of each battery and the voltage difference. Accordingly, the switch controller 40 calculates the threshold by calculating a voltage difference at which the current flowing between the two batteries reaches the current limit and then subtracting a margin α from the calculated voltage difference.

In addition, aside from the current limit, an allowable current that flows safely is determined for a battery. The current flowing in a battery flows via electrical components, such as a relay and a power line and causes heat in the electrical components, and thus, when the temperature of an electrical component almost reaches a temperature limit, it is intended to limit the current. The switch controller 40 thus changes or adjusts the current limit calculated as described above in accordance with the allowable current of a corresponding battery and the temperature of a corresponding electrical component.

When the connection mode is switched from series connection to parallel connection, the current flowing in a battery includes, in addition to the current flowing between the two batteries, a powering current that is supplied to a load (the inverter 12) or a regeneration current that is returned from a load. When the powering current or the regeneration current varies significantly, it is difficult to predict the current flowing in a battery. The switch controller 40 thus predicts the occurrence of a drive in which the powering current or the regeneration current is large and accordingly switches the connection mode to parallel connection while avoiding the time when such a drive is performed.

Next, an instance of parameter calculation processing and switch control processing that enable such a kind of switching of the connection mode will be described in detail.

Parameter Calculation Processing

Figure 2:
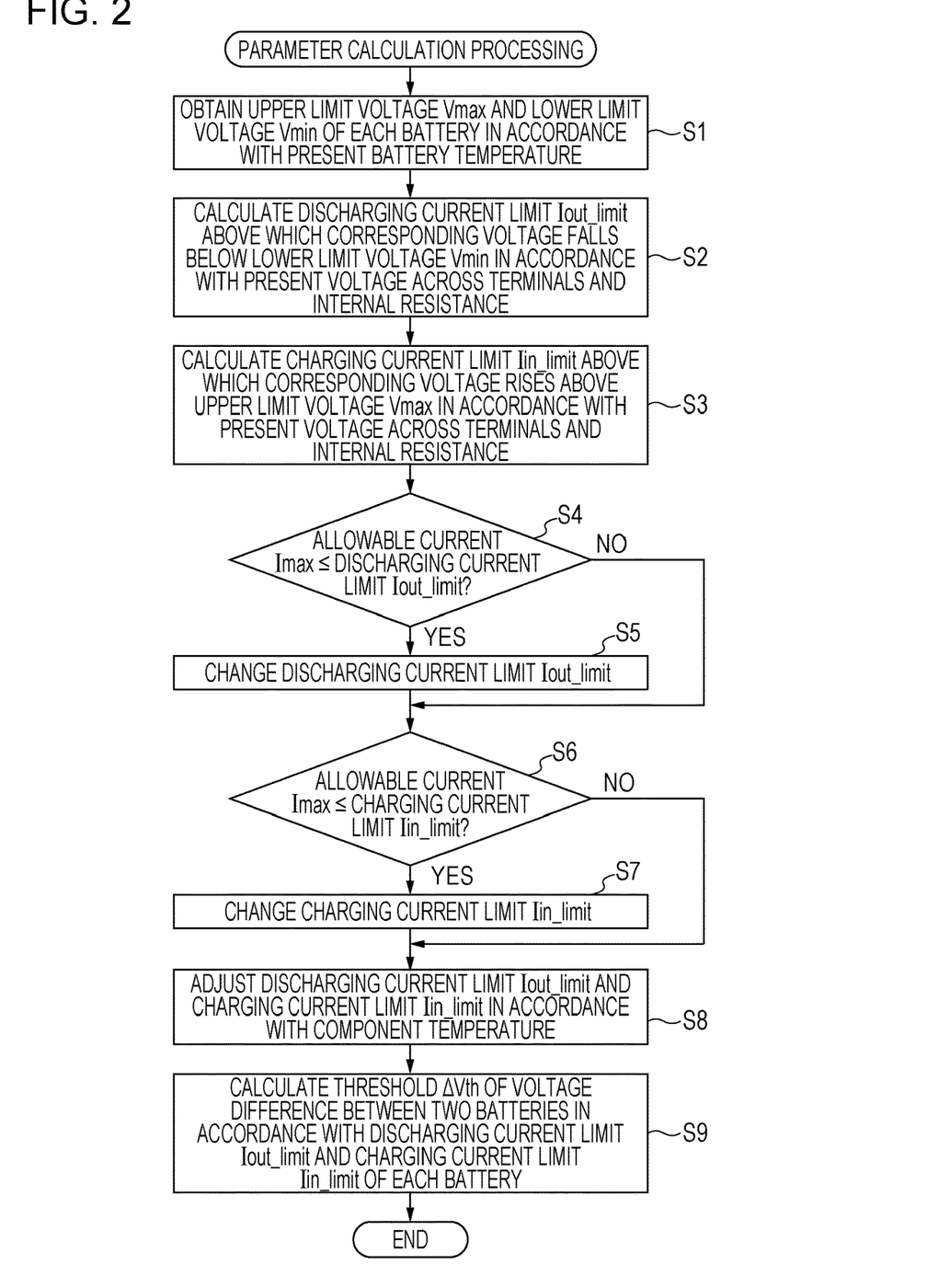
FIG. 2 is a flowchart illustrating a procedure of parameter calculation processing performed by a switch controller.

FIG. 2 is a flowchart illustrating a procedure of parameter calculation processing performed by a switch controller. The parameter calculation processing is performed repeatedly at, for example, predetermined intervals while the electrically powered vehicle 1 on which the supplementary battery 23 is mounted is moving. The parameter calculation processing is performed mainly by the current limit calculation unit 42 and the threshold calculation unit 43.

When the parameter calculation processing is started, the current limit calculation unit 42 firstly obtains an upper limit voltage Vmax and a lower limit voltage Vmin of each of the affixed battery 13 and the supplementary battery 23 in accordance with the current battery temperatures of each battery (step S1). For example, the current limit calculation unit 42 stores in advance a data table containing the upper limit voltage and the lower limit voltage with respect to every battery temperature and obtains the upper limit voltage and the lower limit voltage that correspond to a particular battery temperature of each battery by referring to the data table in accordance with the information of the particular battery temperature of each battery that is transmitted from the battery manager 15.

Subsequently, the current limit calculation unit 42 calculates, with respect to each of the affixed battery 13 and the supplementary battery 23, a discharging current limit Iout_limit above which a corresponding voltage falls below the lower limit voltage Vmin in accordance with the present voltage across terminals Vo and the internal resistance Ri (step S2). The information of the voltage across terminals Vo and the internal resistance Ri is transmitted from the battery manager 15. Here, the current limit calculation unit 42 obtains, as the discharging current limit Iout_limit, for example, a level of current at which a voltage obtained by subtracting a voltage drop caused by the discharging current limit Iout_limit and the internal resistance Ri from the voltage across terminals Vo is equal to the lower limit voltage Vmin.

Next, the current limit calculation unit 42 calculates a charging current limit Iin_limit above which a corresponding voltage rises above the upper limit voltage Vmax in accordance with the present voltage across terminals Vo and the internal resistance Ri (step S3). The information of the voltage across terminals Vo and the internal resistance Ri is transmitted from the battery manager 15. The current limit calculation unit 42 also obtains, as the charging current limit Iin_limit, for example, a level of current at which a voltage obtained by adding a voltage drop caused by the charging current limit Iin_limit and the internal resistance Ri to the voltage across terminals Vo is equal to the upper limit voltage Vmax. The current limit calculation unit 42 performs the calculation described above with respect to each of the affixed battery 13 and the supplementary battery 23.

The current limit calculation unit 42 compares the calculated discharging current limit Iout_limit with a predetermined allowable current Imax (step S4). The allowable current Imax is, for example, an instant maximum allowable current determined as a specification of a battery and denotes a level of current that can safely flow in the battery for a short period. When the allowable current Imax alters depending on the battery temperature, the current limit calculation unit 42 obtains the allowable current Imax corresponding to a particular battery temperature by using the data table that is stored in advance. As the result of comparison, when it is determined that the discharging current limit Iout_limit is above the allowable current Imax, the current limit calculation unit 42 changes the value of the discharging current limit Iout_limit to the value of the allowable current Imax (step S5).

When the determination result obtained in step S4 is NO or when the determination result obtained in step S4 is YES and accordingly a corresponding value is changed in step S5, the current limit calculation unit 42 then compares the calculated charging current limit Iin_limit with the predetermined allowable current Imax (step S6). As the result of comparison, when it is determined that the charging current limit Iin_limit is above the allowable current Imax, the current limit calculation unit 42 changes the value of the charging current limit Iin_limit to the value of the allowable current Imax (step S7). The current limit calculation unit 42 performs the comparison processing and the change processing in steps S4 to S7 with respect to each of the affixed battery 13 and the supplementary battery 23. The allowable current Imax is usually larger than the discharging current limit Iout_limit and the charging current limit Iin_limit calculated in steps S2 or S3, and thus, the comparison results in steps S4 and S6 are usually both NO.

Subsequently, the current limit calculation unit 42 adjusts the value of the discharging current limit Iout_limit and the value of the charging current limit Iin_limit in accordance with the component temperature measured by the temperature sensor 35 (step S8). Specifically, when the component temperature is higher than a predetermined threshold, the current that can flow in the component is controlled to be limited. In this case, the current limit calculation unit 42 adjusts the value of the discharging current limit Iout_limit and the value of the charging current limit Iin_limit to values smaller than the values before adjustment in accordance with the level of current that can flow in a particular component.

After the discharging current limit Iout_limit and the charging current limit Iin_limit are obtained, the threshold calculation unit 43 calculates, in accordance with these currents, a threshold $\Delta Vth$ of the voltage difference at the time of switching the connection mode from series connection to parallel connection (step S9). The voltage difference denotes, as described above, the difference between the voltage across terminals of the affixed battery 13 and the voltage across terminals of the supplementary battery 23. In step S9, for example, the threshold calculation unit 43 obtains the direction of current that flows when the connection mode is parallel connection in accordance with the present voltage difference. The threshold calculation unit 43 also extracts the discharging current limit Iout_limit or the charging current limit Iin_limit that corresponds to the direction of current with respect to each of the affixed battery 13 and the supplementary battery 23. For example, in the case where the voltage across terminals of the affixed battery 13 is smaller than the voltage across terminals of the supplementary battery 23, when the connection mode is switched to parallel connection, the current flows in the direction from the supplementary battery 23 to the affixed battery 13. In this case, the threshold calculation unit 43 extracts the discharging current limit Iout_limit of the supplementary battery 23 and the charging current limit Iin_limit of the affixed battery 13 in accordance with the direction of current. The threshold calculation unit 43 subsequently determines a current limit whose value is smaller among the extracted discharging current limit Iout_limit and the extracted charging current limit Iin_limit as an overall current limit I_limit. The threshold calculation unit 43 calculates a value of $\Delta V\_limit - \alpha$ by subtracting the margin $\alpha$ from a voltage difference $\Delta V\_limit$ at which the current equal to the current limit I_limit flows when the connection mode is switched to parallel connection as the threshold $\Delta Vth$ of the voltage difference. When the connection mode is switched to parallel connection, in the case where it is allowed to use a powering current or a regeneration current equal to or smaller than a predetermined level, the threshold $\Delta Vth$ is calculated by using the margin $\alpha$ determined to cause a corresponding current to not exceed the current limit I_limit when the allowable powering current or the allowable regeneration current is added to the corresponding current.

Switch Control Processing

Figure 3:
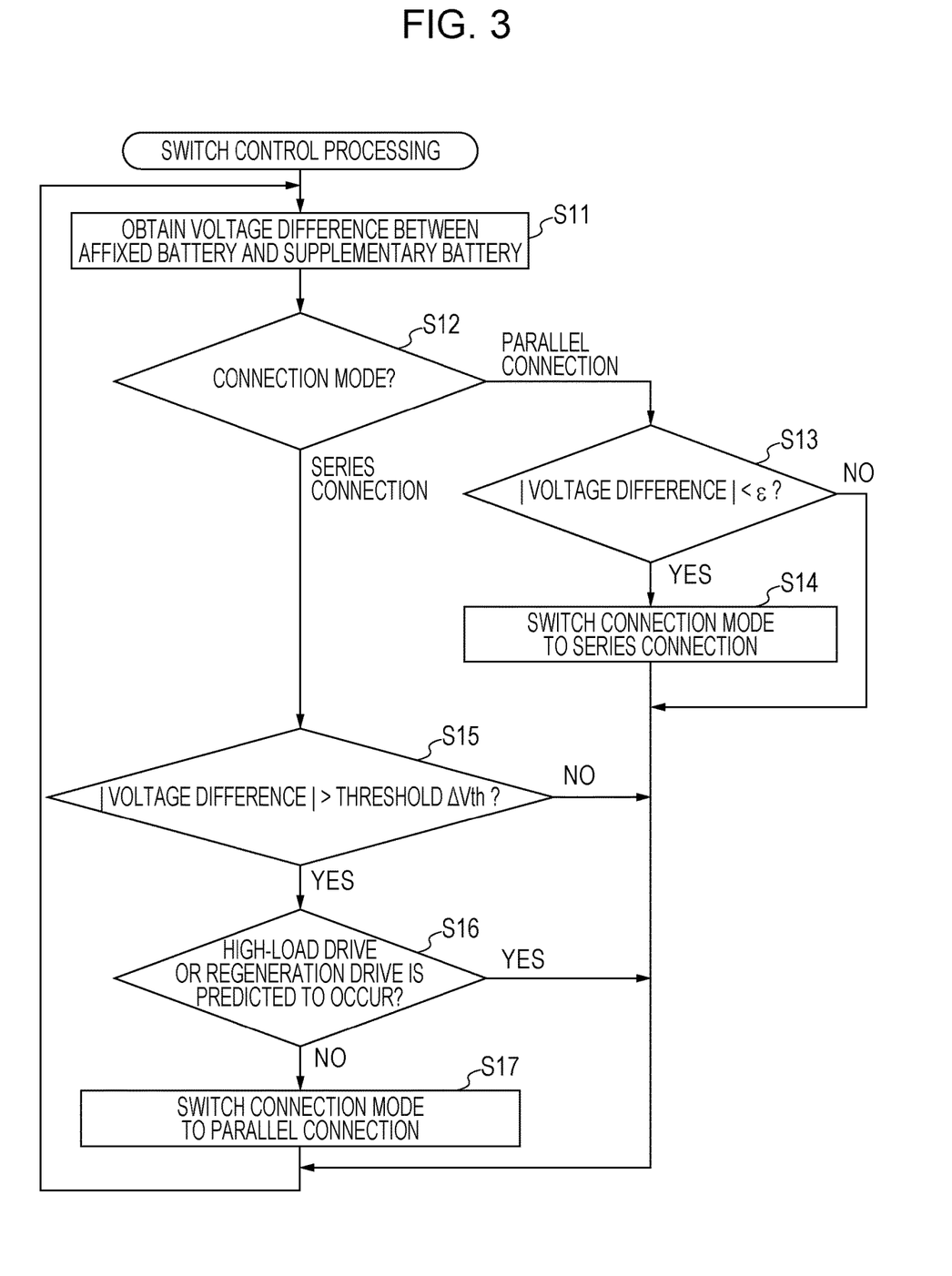
FIG. 3 is a flowchart illustrating a procedure of switch control processing performed by the switch controller.

FIG. 3 is a flowchart illustrating a procedure of switch control processing performed by the switch controller. The switch control processing is continuously performed while the electrically powered vehicle 1 on which the supplementary battery 23 is mounted is moving. The switch control processing is performed mainly by the relay drive control unit 41 and the travel prediction unit 44.

When the switch control processing is started, the relay drive control unit 41 firstly obtains a voltage difference in accordance with the present voltage across terminals of the affixed battery 13 and the present voltage across terminals of the supplementary battery 23 (step S11). The information of the present voltage across terminals of each battery is transmitted from the battery manager 15.

Next, the relay drive control unit 41 checks the present connection mode of the switch 30 (step S12). When the present connection mode is parallel connection, the process proceeds to step S13, or when the present connection mode is series connection, the process proceeds divergently to step S15.

Accordingly, in the case of parallel connection, the relay drive control unit 41 determines that the absolute value of the voltage difference is substantially zero (step S13). In step S13 in FIG. 3, c denotes a small value. As the result of determination, if YES, the relay drive control unit 41 outputs a drive signal to the relays A1 to A3 of the switch 30 and switches the connection mode to series connection (step S14). Conversely, if NO, the process returns to step S11 without any change.

In the case where it is determined in the divergence processing in step S12 that the connection mode is series connection, the relay drive control unit 41 determines whether the voltage difference is larger than the threshold $\Delta Vth$ calculated in step S9 of the parameter calculation processing (step S15). As a result, in the case where it is determined that the voltage difference is larger than the threshold $\Delta Vth$, the relay drive control unit 41 further determines, in accordance with the prediction result obtained by the travel prediction unit 44, whether high-load drive or regeneration drive is predicted to occur within a predetermined period from the present time (step S16). The high-load drive denotes a drive under a load higher than a predetermined first load. In the case where, for example, a drive for going up a steep gradient or an entrance from a general roadway to a highway is predicted in accordance with the information obtained by the navigation system 16, the travel prediction unit 44 predicts the drive or the entrance as a high-load drive and transmits the prediction result to the relay drive control unit 41. Similarly, in the case where, for example, a drive for going down a steep gradient or an exit from a highway to a general roadway is predicted in accordance with the information obtained by the navigation system 16, the travel prediction unit 44 predicts the drive or the exit as a regeneration drive and transmits the prediction result to the relay drive control unit 41. The relay drive control unit 41 performs the determination processing in step S16 in accordance with the prediction result described above. The resultant operations in accordance with the different results in step S16 will be described in detail later with reference to FIGS. 8A and 8B.

In the case where it is determined as NO in the determination processing in step S16, the relay drive control unit 41 outputs a drive signal to the relays A1 to A3 of the switch 30 and switches the connection mode to parallel connection (step S18). In contrast, in the case where the determination result obtained in step S15 is NO or the determination result obtained in step S16 is YES, the process returns to step S11. The relay drive control unit 41 then repeats the process from step S11.

Instance of Change in SOC and Battery Current Caused by Switch Control

Figure 4A:
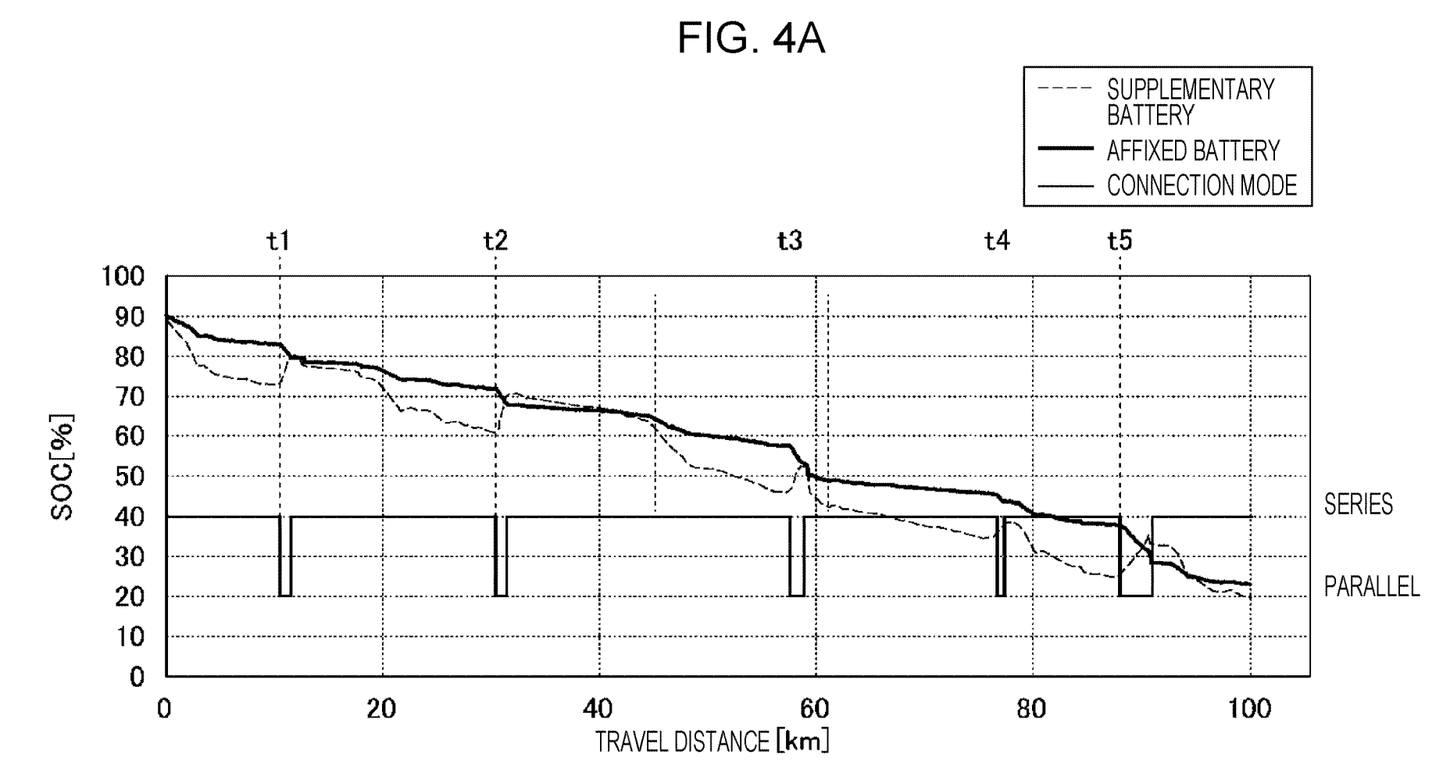
FIG. 4A is a first graph and FIG. 4B is a second graph, both of which illustrate switch control according to the embodiment of the disclosure.
Figure 4B:
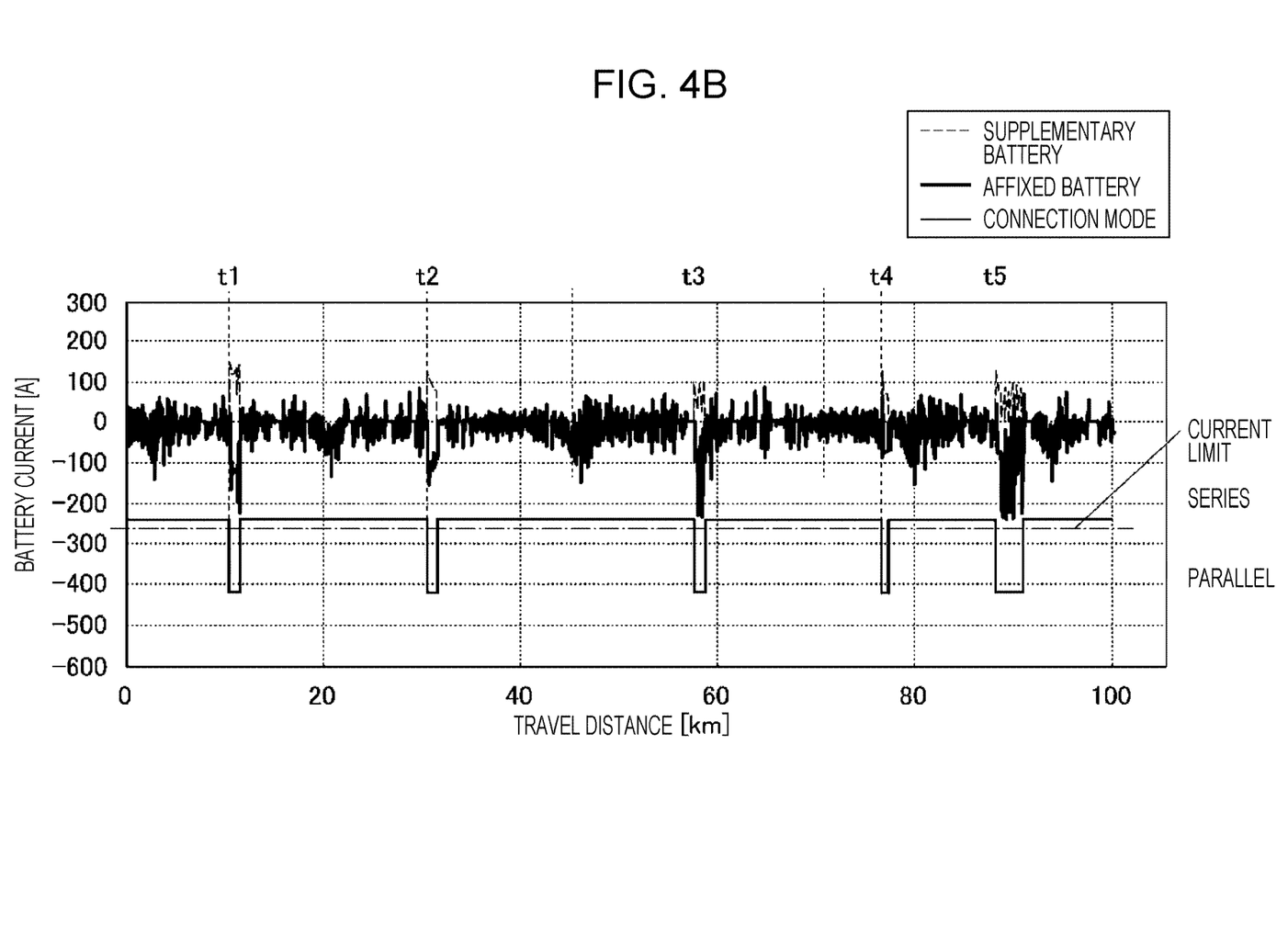

FIG. 4A is a first graph and FIG. 4B is a second graph, both of which illustrate switch control according to the embodiment of the disclosure. The first graph and the second graph both illustrate an instance of the same switch control during the same drive. The first graph illustrates the change in the SOC of the affixed battery 13 and the change in the SOC of the supplementary battery 23 with respect to the travel distance and the second graph illustrates the change in the battery current of the affixed battery 13 and the change in the battery current of the supplementary battery 23.

According to the parameter calculation processing and the switch control processing described above, as illustrated in FIGS. 4A and 4B, electric power is supplied to the inverter 12 generally in the state where the affixed battery 13 and the supplementary battery 23 are coupled to each other in series. By coupling the two batteries to each other in series, the output voltage supplied to the inverter 12 increases, and as a result, the output current can be decreased when the same level of power is output. The decrease in the output current contributes to the decrease in the electrical loss in a power line and a relay in a closed state through which the output current flows, and therefore, the efficiency of power transmission increases.

When the connection mode is series connection and the travel distance increases, the difference in the SOC between the affixed battery 13 and the supplementary battery 23 accordingly increases, and as a result, the voltage difference between the two batteries increases. When the voltage difference reaches the threshold, the connection mode is switched to parallel connection (times t1 to t5). As illustrated in FIG. 4B, when the connection mode is switched to parallel connection in a state in which the voltage difference exists, a current flows between the affixed battery 13 and the supplementary battery 23. However, because the threshold $\Delta Vth$ of the voltage difference is appropriately calculated, the case where the level of current in the affixed battery 13 and/or the level of current in the supplementary battery 23 exceeds the current limit when the connection mode is switched to parallel connection is hindered.

When the SOC of the affixed battery 13 and the SOC of the supplementary battery 23 reaches equal to each other after the connection mode is switched to parallel connection, the connection mode is switched again to series connection, and as a result, highly efficient power supply is achieved.

In this manner, the power accumulated in the affixed battery 13 and the power accumulated in the supplementary battery 23 are effectively and efficiently used and it is therefore possible to extend the drive range of the electrically powered vehicle 1.

First Comparative Example of Switch Control

Figure 5:
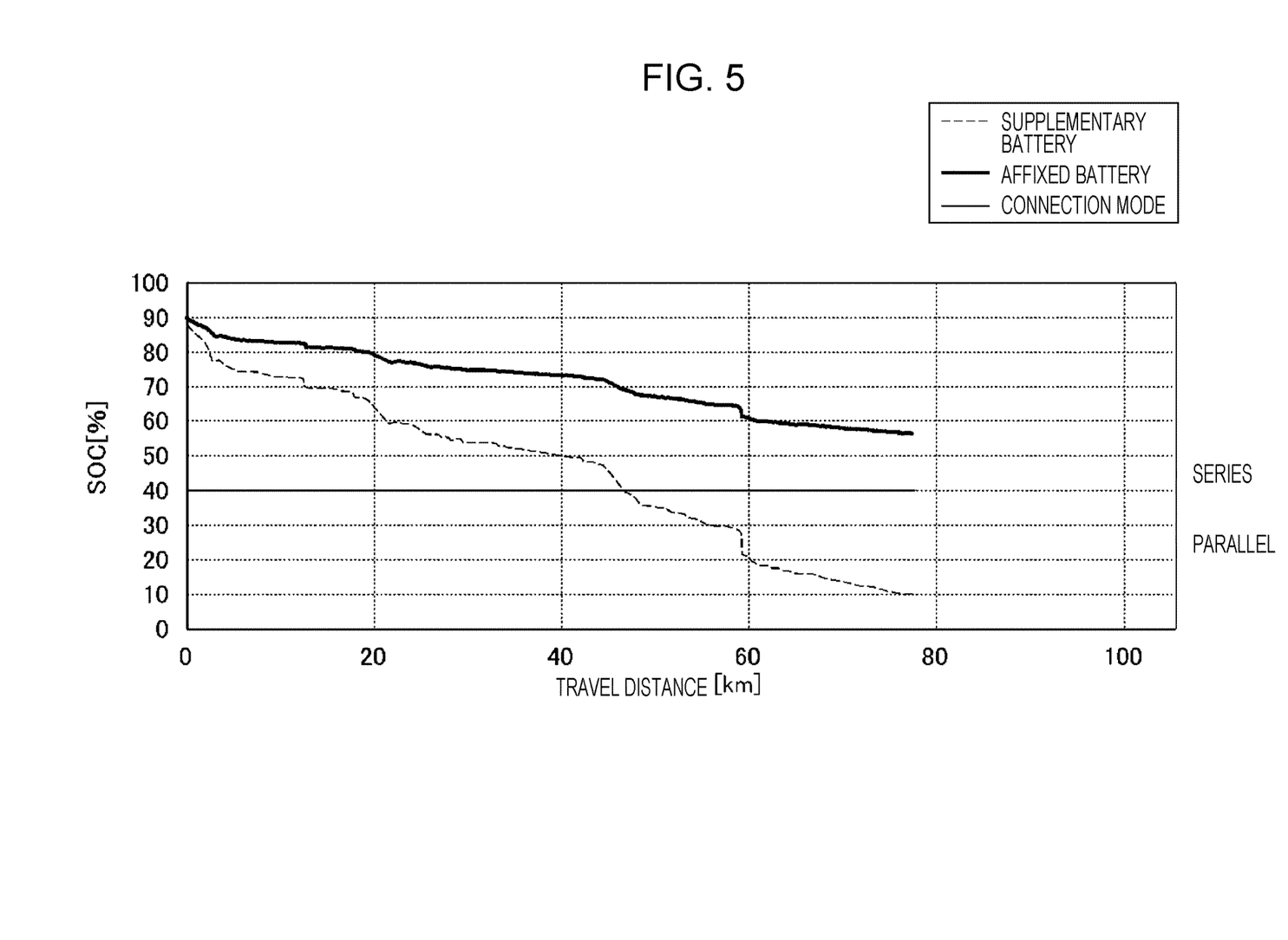
FIG. 5 is a graph illustrating switch control of a first comparative example.

FIG. 5 is a graph illustrating switch control of a first comparative example. In the first comparative example, the affixed battery 13 and the supplementary battery 23 are coupled to each other in series. In the switch control of the first comparative example, for example, in the case where the electric capacity of the affixed battery 13 and the electric capacity of the supplementary battery 23 differ from each other, when the batteries each have the same initial SOC, as the travel distance increases, the difference in the SOC between the affixed battery 13 and the supplementary battery 23 increases. Consequently, the power of one battery (for example, the supplementary battery 23) is exhausted. In this case, in the state where the power accumulated in the other battery (for example, the affixed battery 13) still remains, the travel motor 11 cannot be driven. As a result, the accumulated power cannot be used effectively and the drive range is thus decreased.

Second Comparative Example of Switch Control

Figure 6:
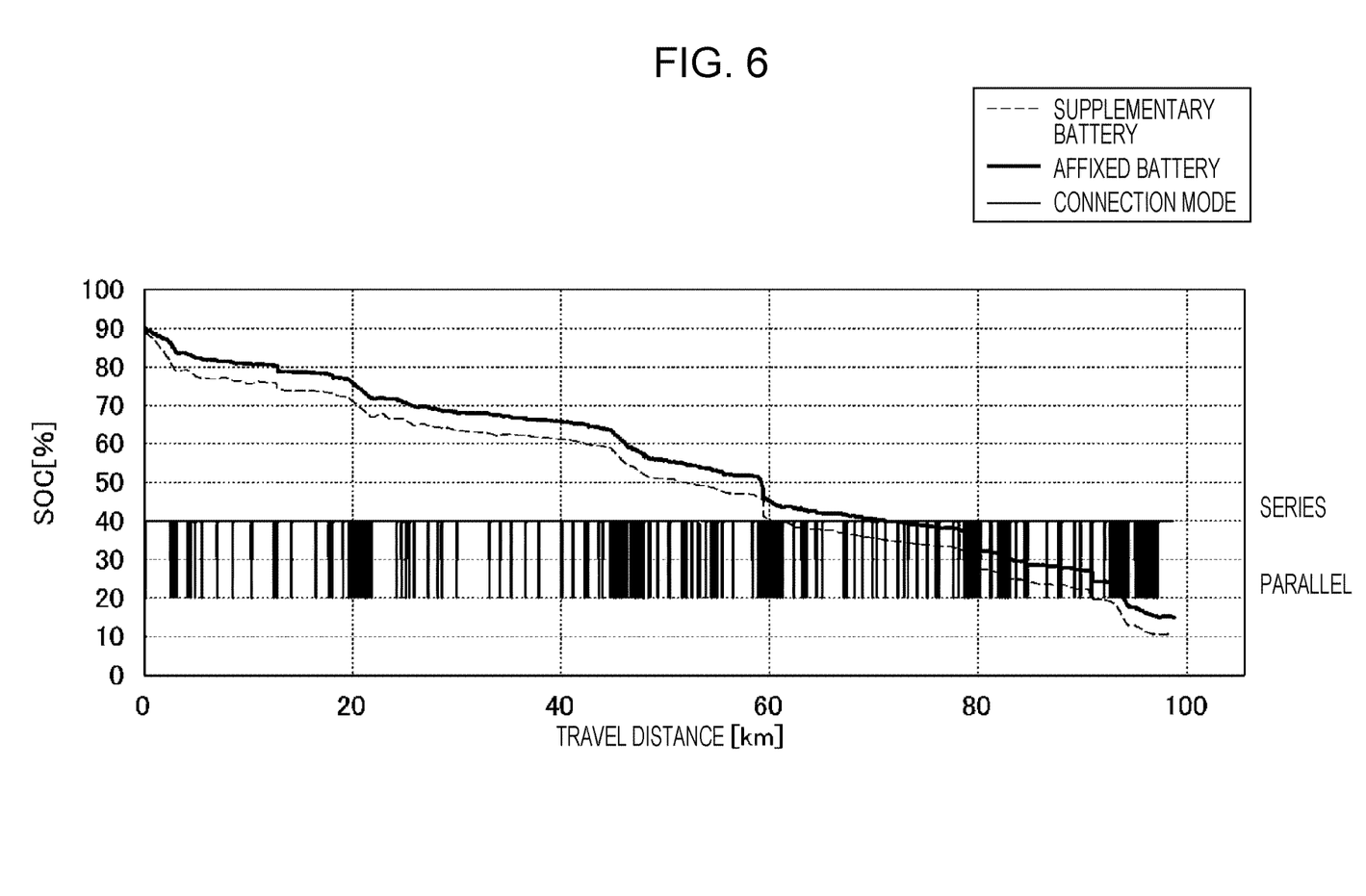
FIG. 6 is a graph illustrating switch control of a second comparative example.

FIG. 6 is a graph illustrating switch control of the second comparative example. In the second comparative example, for example, when the difference in the SOC between the affixed battery 13 and the supplementary battery 23 exceeds a predetermined value, the connection mode is switched to parallel connection. In the switch control of the second comparative example, both the power of the affixed battery 13 and the power of the supplementary battery 23 can be completely used. However, the number of time of switching the switch 30 increases and this accelerates the deterioration of the relays A1 to A3 and the life of the relays A1 to A3 ends in a short period of time.

Third Comparative Example of Switch Control

Figure 7A:
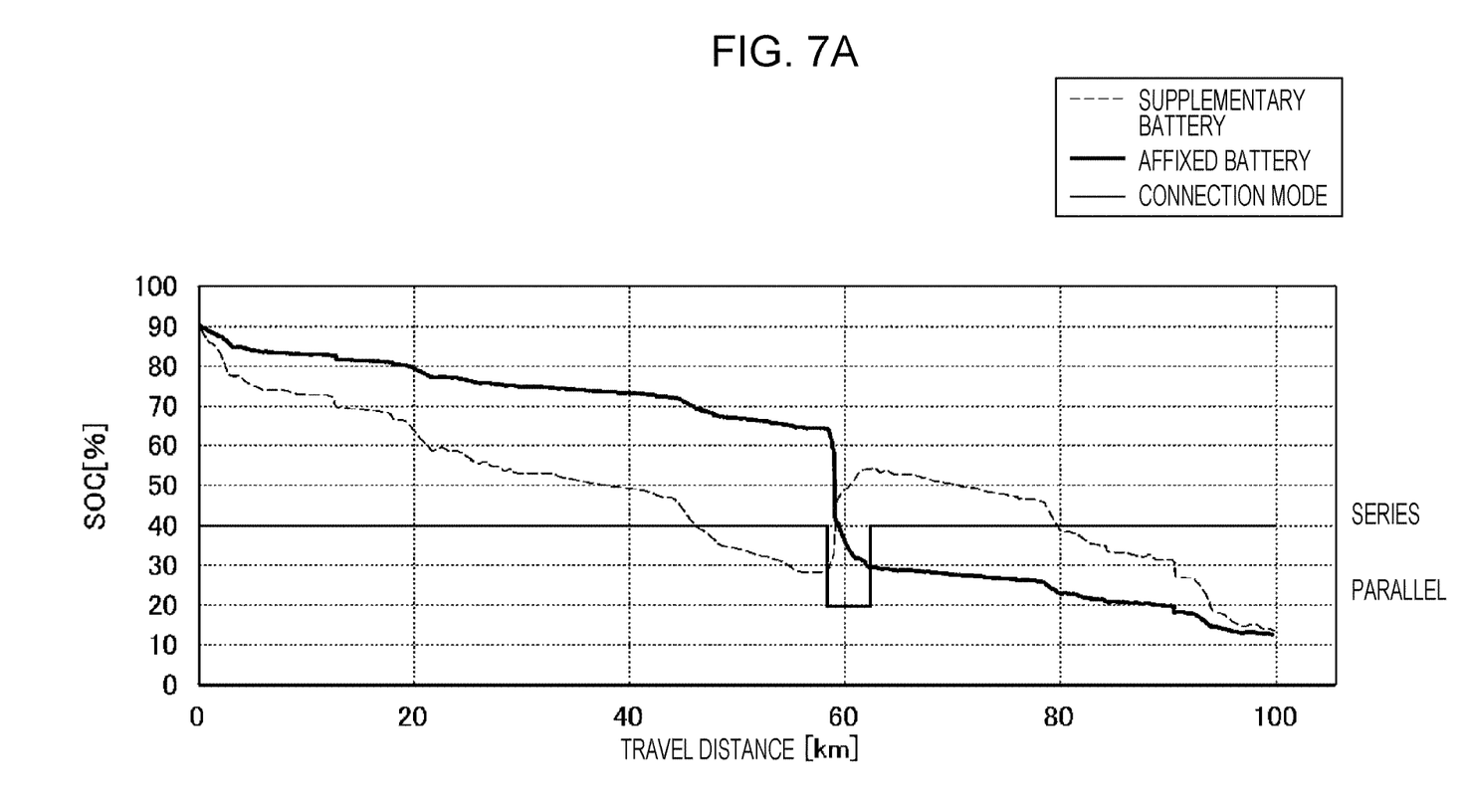
FIG. 7A is a first graph and FIG. 7B is a second graph, both of which illustrate switch control according to a third comparative example.
Figure 7B:
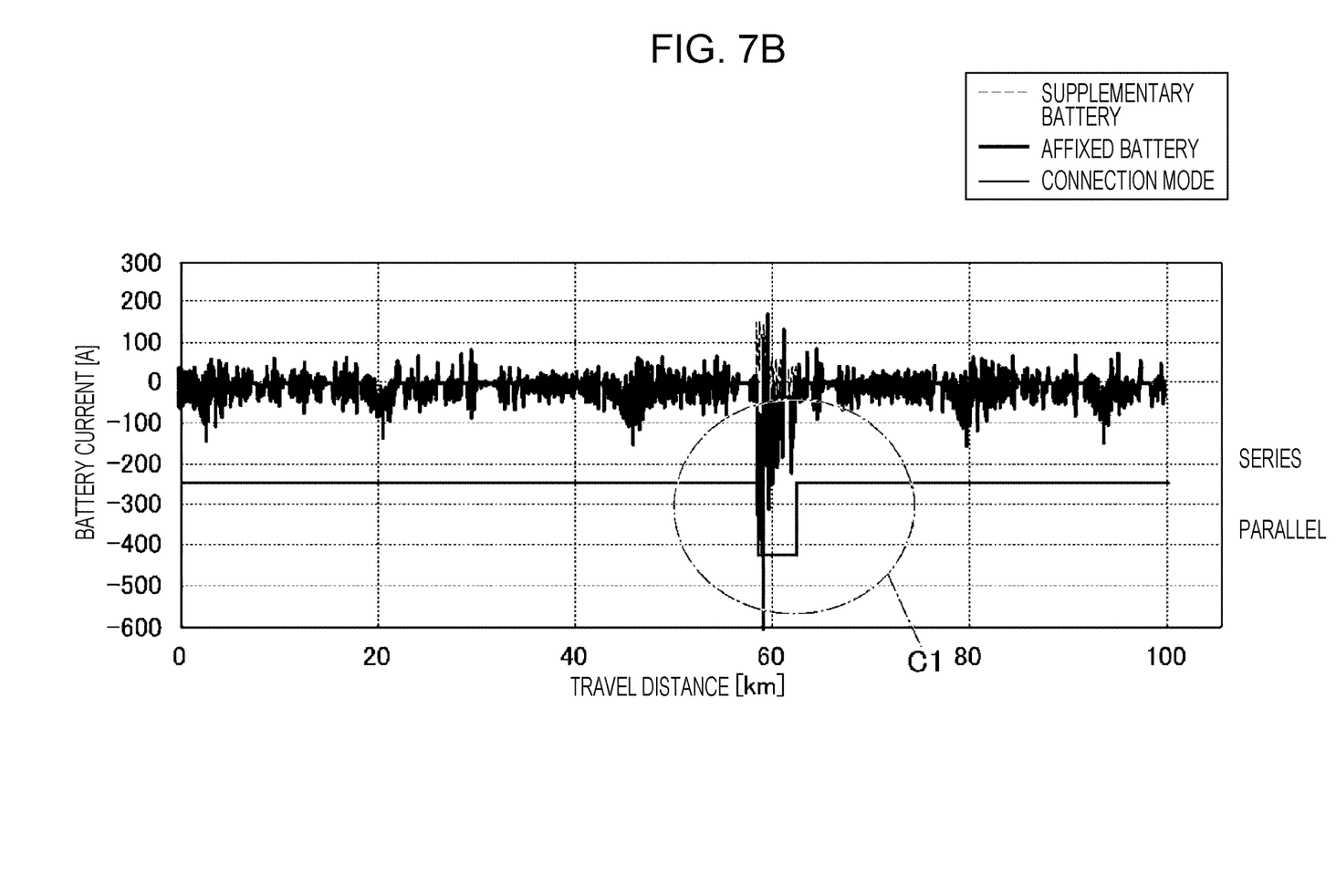

FIG. 7A is a first graph and FIG. 7B is a second graph, both of which illustrate switch control according to a third comparative example. In the third comparative example, the switching is controlled to completely use the power of the affixed battery 13 and the power of the supplementary battery 23 and to decrease the number of time of switching the switch 30. In the switch control of the third comparative example, the affixed battery 13 and the supplementary battery 23 can be completely used and the deterioration of the relays A1 to A3 can be hindered. However, when the connection mode is switched from series connection to parallel connection, the voltage difference between the affixed battery 13 and the supplementary battery 23 may become significantly large. In such a case, as illustrated in a reference part C1, a current exceeding the current limit flows in the affixed battery 13, the supplementary battery 23, or both.

Using the switch control of the embodiment of the disclosure reduces the problems described in the first to third comparative examples and the increase in the drive range and the improvement in electric power efficiency can be encouraged.

Switch Control During High-Load Drive or Regeneration Drive

Figure 8A:
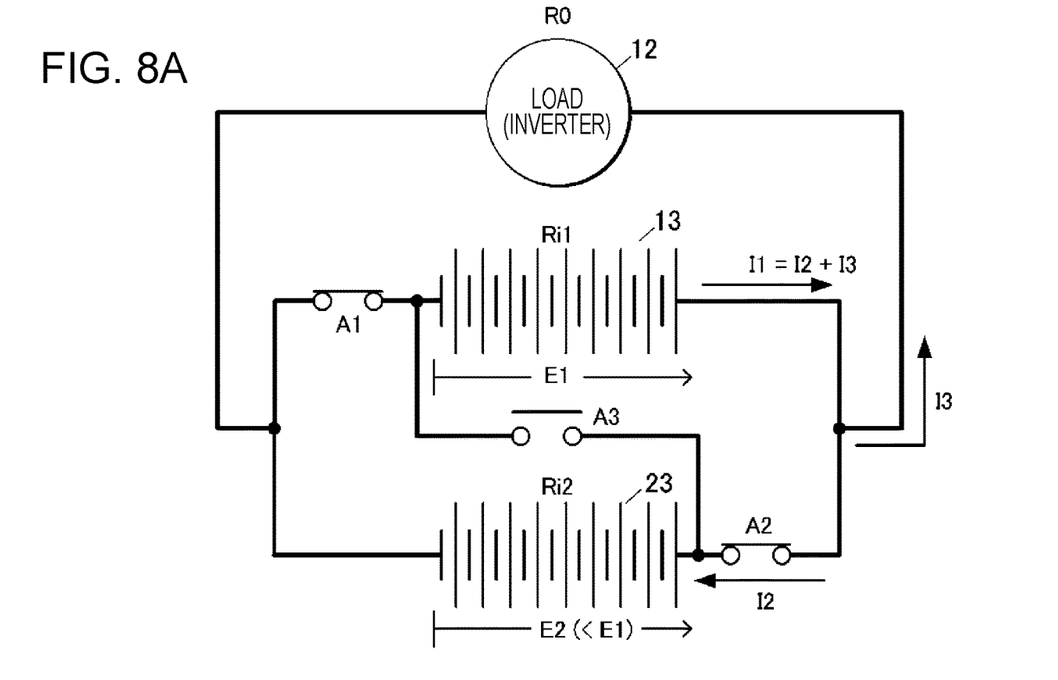
FIGS. 8A and 8B illustrate the battery current when the connection mode is switched from series connection to parallel connection, where
Figure 8B:
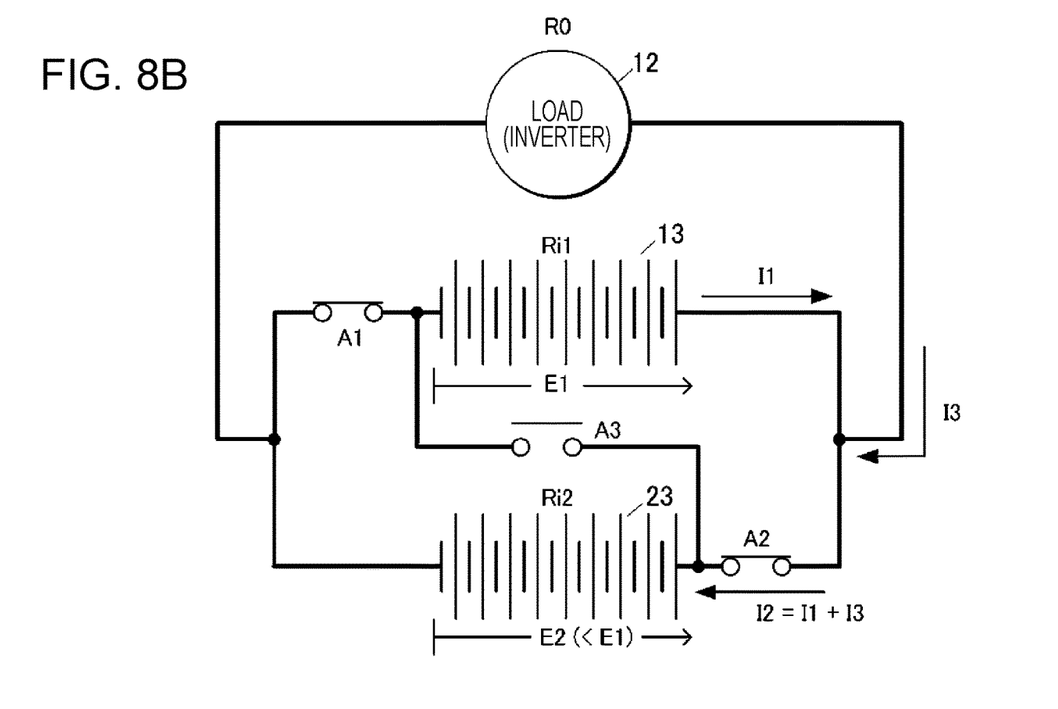

FIGS. 8A and 8B illustrate the battery current when the connection mode is switched from series connection to parallel connection. FIG. 8A illustrates the case of powering and FIG. 8B illustrates the case of regeneration. Here, the resultant operations in accordance with the different results in step S16 in FIG. 3 are described.

When the affixed battery 13 and the supplementary battery 23 are coupled to each other in parallel, currents I1, I2, and I3 are determined in accordance with an open-circuit voltage E1 and the internal resistance Ri1 of the affixed battery 13, an open-circuit voltage E2 and the internal resistance Ri2 of the supplementary battery 23, and a load R0.

When the current I3 flowing in the load R0 is small, the current I1 of the affixed battery 13 and the current I2 of the supplementary battery 23 are predicted in accordance with the open-circuit voltages E1 and E2, and the internal resistances Ri1 and Ri2. By using this rule, the threshold calculation unit 43 of the switch controller 40 calculates the threshold $\Delta Vth$ of the voltage difference at which both the current I1 and I2 do not exceed the current limit.

As a result, when the current I3 flowing in the load R0 is large during high-load drive as illustrated in FIG. 8A or when the regeneration current I3 flowing in the load R0 is relatively large during regeneration drive as illustrated in FIG. 8B, the level of the current I1 and the level of the current I2 deviate largely from predicted values due to the effect of the current I3. For example, the open-circuit voltage E1 of the affixed battery 13 is larger than the open-circuit voltage E2 of the supplementary battery 23, the discharging current I1 of the affixed battery 13 is large during high-load drive, whereas the charging current I2 of the supplementary battery 23 is large during regeneration drive.

For this reason, when the travel prediction unit 44 performs drive prediction processing and it is determined in the determination processing in step S16 in FIG. 3 that high-load drive or regeneration drive is predicted to occur, the switch controller 40 of the embodiment of the disclosure performs switching of the connection mode to parallel connection while avoiding the period of high-load drive or regeneration drive. By performing this control, when the connection mode is switched to parallel connection, an unexpected large current flowing in the affixed battery 13 or the supplementary battery 23 is avoided.

Another configuration is assumed in which the power of the affixed battery 13 and the power of the supplementary battery 23 are used for a device other than the electrically powered vehicle, such as an air conditioning device. With this configuration, in the case where large power is output to the device, similarly to the case of high-load drive described above, when the connection mode is switched to parallel connection, the current I1 or the current I2 may become large. Hence, in this configuration, when the connection mode is switched to parallel connection, by performing control for stopping power supply to the device, such as control for stopping an air conditioning device, the current I1 or the current I2 may be controlled to not exceed the current limit.

As described above, the electrically powered vehicle 1 according to the embodiment of the disclosure includes the battery mounting member 20 on which the supplementary battery is detachably mountable and the connection of the affixed battery 13 and the supplementary battery 23 is controlled to be series or parallel connection by using the switch 30. For example, when a user desires to extend the drive range while driving the electrically powered vehicle 1, the user can load the supplementary battery 23 into the electrically powered vehicle 1 at a service station or a service area. This enables extending the drive range of the electrically powered vehicle 1 without spending long time for charging a battery.

In the case where the supplementary battery 23 is mounted on the battery mounting member 20, it is assumed that, every time a new supplementary battery is mounted, the electric capacity, the SOC, and the like alter. However, in the electrically powered vehicle 1 according to the embodiment of the disclosure, the switch controller 40 switches the connection mode of the switch 30 between parallel and series connections in accordance with the condition information about the affixed battery 13 and the condition information about the supplementary battery 23. This enables switching control of the connection mode while reflecting the condition of the affixed battery 13 and the condition of the supplementary battery 23. For example, it is possible to perform control to not cause an excessive current to flow in the affixed battery 13 or the supplementary battery 23 when the connection mode is changed and to not increase the number of time the switch 30 is switched.

Furthermore, in the electrically powered vehicle 1 according to the embodiment of the disclosure, the switch controller 40 obtains the voltage difference between the affixed battery 13 and the supplementary battery 23 and changes the connection mode of the switch 30 in accordance with the obtained voltage difference. In this manner, it is possible to easily perform control to not cause an excessive current to flow in the affixed battery 13 or the supplementary battery 23 when the connection mode is changed and to not increase the number of time the switch 30 is switched.

Moreover, in the electrically powered vehicle 1 according to the embodiment of the disclosure, when the connection mode is switched to parallel connection, the threshold $\Delta V_{th}$ of the voltage difference at which both the current flowing in the affixed battery 13 and the current flowing in the supplementary battery 23 do not exceed the current limit is calculated. The relay drive control unit 41 switches the connection mode to parallel connection in accordance with the comparison result of the voltage difference between the affixed battery 13 and the supplementary battery 23 and the threshold $\Delta V_{th}$. In this manner, the current of the affixed battery 13 and the current of the supplementary battery 23 are each controlled to not exceed the current limit when the connection mode is switched to parallel connection and the increase in the number of times the switch 30 is switched can be suppressed within a range not exceeding the current limit.

Further, the electrically powered vehicle 1 according to the embodiment of the disclosure includes the temperature sensor 35 configured to measure the temperature of a component in which the current of the affixed battery 13 or the current of the supplementary battery 23 flows and the switch controller 40 switches the switch 30 in accordance with information containing information of the temperature measured by the temperature sensor 35. In this manner, when the temperature of a component is high and it is intended to decrease the current limit, it is possible to perform control of the switch 30 to deal with this condition.

Specifically, the current limit calculation unit 42 of the switch controller 40 adjusts the current limit in accordance with the temperature of a particular component and the threshold calculation unit 43 calculates the threshold $\Delta V_{th}$ of the voltage difference in accordance with the adjusted current limit. In this manner, when the connection mode of the switch 30 is switched to parallel connection, it is possible to avoid the case where a current exceeding the current limit associated with the temperature of a particular component flows.

Moreover, in the electrically powered vehicle 1 according to the embodiment of the disclosure, the travel prediction unit 44 of the switch controller 40 predicts the occurrence of high-load drive or regeneration drive and the relay drive control unit 41 switches the connection mode to parallel connection while avoiding the period of high-load drive or regeneration drive. Accordingly, when it is difficult, due to powering current or regeneration current of the travel motor 11, to predict the current flowing in the affixed battery 13 or the supplementary battery 23 when the connection mode is switched to parallel connection, the problem can be avoided because the connection mode is changed while avoiding the period of high-load drive or regeneration drive. In this manner, it is possible to avoid the case where a current exceeding the current limit flows in the affixed battery 13 or the supplementary battery 23 when the connection mode is changed.

As above, the embodiment of the disclosure has been described. The disclosure is, however, not limited to the embodiment described above. For example, in the above embodiment, the switch controller 40 obtains the voltage difference in accordance with the voltage across terminals of the affixed battery 13 and the voltage across terminals of the supplementary battery 23. However, the switch controller 40 may obtain the voltage difference by, for example, using the voltages across terminals obtained by converting the value of the SOC of the affixed battery 13 and the value of the SOC of the supplementary battery 23 into the voltages across terminals or converting the difference in the SOC between the affixed battery 13 and the supplementary battery 23 into the voltage difference. In addition, the details described in the embodiment can be changed as appropriate without departing from the scope of the disclosure.

The disclosure has an advantage in which both the power of an originally loaded battery and the power of an additionally loaded battery are effectively utilized when there is a substantial difference in the specifications or the battery condition between the originally loaded battery and the additionally loaded battery.

The invention claimed is:
1. An electrically powered vehicle comprising:
   a battery configured to be installed in the electrically powered vehicle and to supply electric power to the electrically powered vehicle for moving;
   a mounting member configured to mount a supplementary battery configured to supply electric power to the electrically powered vehicle for moving;

a switch configured to switch connection of the battery and the supplementary battery mounted on the mounting member between series and parallel connections; and a switch controller configured to:
calculate a difference value between a first terminal voltage of the battery and a second terminal voltage of the supplementary battery,
calculate a threshold by subtracting a margin from the difference value at which output current or input current of one or both of the battery and the supplementary battery exceeds a current upper limit value when the switch is switched from the series connection to the parallel connection, the margin being at least more than powering current or regeneration current, and
control the switch from the series connection to the parallel connection when the switch controller detects that the difference value exceeds the threshold,
wherein the switch controller is configured to control the switch from the parallel connection to the series connection when the switch controller detects that the difference value is approximately zero.

2. The electrically powered vehicle according to claim 1, wherein
the switch controller obtains a value of a voltage difference between a voltage across terminals of the battery and a voltage across terminals of the supplementary battery mounted on the mounting member and controls the switch in accordance with the condition information about the battery, the condition information about the supplementary battery mounted on the mounting member, and the voltage difference.

3. The electrically powered vehicle according to claim 2, further comprising:
a temperature sensor configured to measure a temperature of a component in which a current of the battery or a current of the supplementary battery mounted on the mounting member flows, wherein
the switch controller controls the switch in accordance with the condition information about the battery, the condition information about the supplementary battery mounted on the mounting member, the voltage difference, and the temperature of the component.

4. The electrically powered vehicle according to claim 1, further comprising:
a temperature sensor configured to measure a temperature of a component in which a current of the battery or a current of the supplementary battery mounted on the mounting member flows, wherein
the switch controller controls the switch in accordance with the condition information about the battery, the condition information about the supplementary battery mounted on the mounting member, the voltage difference, and the temperature of the component.

5. The electrically powered vehicle according to claim 4, wherein
the switch controller adjusts the current limit in accordance with the temperature of the component.

6. The electrically powered vehicle according to claim 1, further comprising:
a travel prediction unit configured to predict an occurrence of regeneration drive or an occurrence of high-load drive in which a load is greater than a predetermined first load, wherein
the switch controller switches the switch to parallel connection while avoiding a period of the predicted regeneration drive or the predicted high-load drive.

7. The electrically powered vehicle according to claim 2, further comprising:
a travel prediction unit configured to predict an occurrence of regeneration drive or an occurrence of high-load drive in which a load is greater than a predetermined first load, wherein
the switch controller switches the switch to parallel connection while avoiding a period of the predicted regeneration drive or the predicted high-load drive.

8. The electrically powered vehicle according to claim 1, further comprising:
a travel prediction unit configured to predict an occurrence of regeneration drive or an occurrence of high-load drive in which a load is greater than a predetermined first load, wherein
the switch controller switches the switch to parallel connection while avoiding a period of the predicted regeneration drive or the predicted high-load drive.

9. The electrically powered vehicle according to claim 1, wherein
the condition information about the battery contains information of a state of charge and a degradation level of the battery, and
the condition information about the supplementary battery mounted on the mounting member contains information of a state of charge and a degradation level of the supplementary battery.

10. The electrically powered vehicle according to claim 2, wherein
the condition information about the battery contains information of a state of charge and a degradation level of the battery, and
the condition information about the supplementary battery mounted on the mounting member contains information of a state of charge and a degradation level of the supplementary battery.

11. The electrically powered vehicle according to claim 1, wherein
the condition information about the battery contains information of a state of charge and a degradation level of the battery, and
the condition information about the supplementary battery mounted on the mounting member contains information of a state of charge and a degradation level of the supplementary battery.

12. The electrically powered vehicle according to claim 1, wherein
the mounting member comprises a connection electrode configured to be coupled to an electrode of the supplementary battery when the supplementary battery is mounted on the mounting member, and
the switch comprises multiple relays configured to be used to change electrical connection between an electrode of the battery and the connection electrode.

13. The electrically powered vehicle according to claim 2, wherein
the mounting member comprises a connection electrode configured to be coupled to an electrode of the supplementary battery when the supplementary battery is mounted on the mounting member, and
the switch comprises multiple relays configured to be used to change electrical connection between an electrode of the battery and the connection electrode.

14. The electrically powered vehicle according to claim 1, wherein the mounting member comprises a connection electrode configured to be coupled to an electrode of the supplementary battery when the supplementary battery is mounted on the mounting member, and the switch comprises multiple relays configured to be used to change electrical connection between an electrode of the battery and the connection electrode.

15. An electrically powered vehicle comprising:

a battery configured to be installed in the electrically powered vehicle and to supply electric power to the electrically powered vehicle for moving;

a mounting member configured to mount a supplementary battery configured to supply electric power to the electrically powered vehicle for moving;

a switch configured to switch connection of the battery and the supplementary battery mounted on the mounting member between series and parallel connections; and circuitry configured to:

calculate a difference value between a first terminal voltage of the battery and a second terminal voltage of the supplementary battery, calculate a threshold by subtracting a margin from the difference value at which output current or input current of one or both of the battery and the supplementary battery exceeds a current upper limit value when the switch is switched from the series connection to the parallel connection, the margin being at least more than powering current or regeneration current, and control the switch from the series connection to the parallel connection when the circuitry detects that the difference value exceeds the threshold, wherein the circuitry is configured to control the switch from the parallel connection to the series connection when the circuitry detects that the difference value is approximately zero.

* * * * *